United States Patent [19]

Perry

[11]  4,194,939
[45]  Mar. 25, 1980

[54] METHOD OF MAKING LAYERED FABRICS

[75] Inventor: Glen D. Perry, Cary, N.C.

[73] Assignee: Monsanto Company, St. Louis, Mo.

[21] Appl. No.: 848,552

[22] Filed: Nov. 4, 1977

Related U.S. Application Data

[60] Division of Ser. No. 667,002, Mar. 15, 1976, Pat. No. 4,142,016, which is a continuation-in-part of Ser. No. 555,006, Mar. 3, 1975, abandoned.

[51] Int. Cl.$^2$ .......................... B32B 31/18; C09J 5/06
[52] U.S. Cl. .................................. 156/254; 156/62.2; 156/276; 156/296; 156/305; 428/904
[58] Field of Search ...................... 156/254, 62.2, 276, 156/305, 62.4, 181, 271, 296; 428/904

[56]  References Cited

U.S. PATENT DOCUMENTS

| 1,459,499 | 6/1923 | Brown et al. | 156/254 |
| 3,388,028 | 6/1968 | Alexander | 428/246 |
| 3,437,539 | 4/1969 | Mesek et al. | 156/254 |
| 3,483,051 | 12/1969 | Mesek et al. | 156/254 |
| 3,794,537 | 2/1974 | Rahmes | 156/296 X |

FOREIGN PATENT DOCUMENTS 972633  10/1964  United Kingdom ..................... 156/254

*Primary Examiner*—Michael G. Wityshyn
*Attorney, Agent, or Firm*—Thomas N. Wallin; Donald J. Fitzpatrick

[57]  ABSTRACT

Fabrics having strength despite low bulk density and comprising at least one reinforcing layer of textile-length fibers, at least one layer of short bulk fibers and a bonding agent distributed throughout said fabric layers. Also a process for producing a fabric having a layer of such bulk fibers disposed between two of such reinforcing layers and a process for producing a fabric having a surface layer of such bulk fibers wherein a multi-layered structure containing an interior layer of short bulk fibers is split along a continuum of lowered bonding agent concentrations at locations predetermined by controlled heating of the structure.

5 Claims, No Drawings

METHOD OF MAKING LAYERED FABRICS

CROSS-REFERENCE TO RELATED APPLICATION

This is a division of application Ser. No. 667,002, filed Mar. 15, 1976, now U.S. Pat. No. 4,142,016 which is a continuation-in-part of my application Ser. No. 555,006 (now abandoned) which was filed on Mar. 3, 1975.

BACKGROUND OF THE INVENTION

Layered fabrics of many types are known in the art. They include flocked fabrics, e.g. as described in U.S. Pat. No. 3,262,128 issued July 26, 1966 to W. L Morgan et al and U.S. Pat. No. 3,314,845 issued Apr. 18, 1967 to J. M Perri, multi-layered nonwoven fabrics comprising two surface layers of textile-length fibers and an interior layer of short, nontextile length fibers, e.g. as described in U.S. Pat. No. 3,388,028 issued June 11, 1968 to R. R. Alexander, various types of laminates, e.g. as described in U.S. Pat. No. 3,063,454 issued Nov. 13, 1962 to H. W. Coates et al; U.S. Pat. No. 3,615,976 issued Oct. 26, 1971 to D. D. Endres et al; U.S. Pat. No. 3,695,985 issued Oct. 3, 1972 to R. J. Brock et al; U.S. Pat. No. 3,765,997 issued Oct. 16, 1973 to C. E. Dunning; U.S. Pat. No. 3,794,537 issued Feb. 26, 1974 to D. W. Rahmes; U.S. Pat. No. 3,862,877 issued Jan. 28, 1975 to J. B. Camden; and U.S. Pat. No. 3,870,592 issued Mar. 11, 1975 to R. J. Brock et al, and split-web fabric products, e.g. as described in U.S. Pat. No. 3,437,539 issued Apr. 8, 1969 to F. K. Mesek and U.S. Pat. No. 3,483,051 issued Dec. 9, 1969 to F. K. Mesek et al.

In general the layered fabrics of the prior art have been undesirably thin or, if thicker, then too stiff, dense and/or papery for many desired end uses such as, for example, in apparel. Various laminates have been prepared in attempts to overcome these problems, but in most cases simply bonding fiber layers together with layers of adhesive has resulted in fabrics deficient in strength (e.g. breaking or tear strength) or in delamination resistance, and therefore not sufficiently durable for various end uses. In particular, launderability has been a problem for many of these fabrics.

Attempts have been made to solve some of these difficulties by through-bonding of certain types of layered fabric, e.g. as described in U.S. Pat. No. 3,388,028, but this technique has been typically regarded as limited to the use of reinforcing outer layers composed of relatively short fiber (e.g. carded staple) and an interior layer that is relatively thin, light in weight and non-uniform (e.g. in fiber density). Although this technique has produced in some cases fabrics of less stiffness, it has also typically resulted in fabrics of limited fabric thickness and bulk, relatively low strength and delamination resistance and a non-uniform surface appearance.

With the object of providing layered fabrics having surface textures and appearances that are novel and more pleasing to the sight and touch, there have been developed several split-web processes, e.g. those described in U.S. Pat. No. 3,437,539. Again, however, these approaches have been typically carried out exclusively with relatively short reinforcing fibers, relatively thin layers of fibers (especially in the layer to be split) and highly directionally oriented fibers in the layer to be split, and the resulting fabrics have been therefore typically characterized by relatively low strength, moderately high bulk density, limited thickness and weight and the presence of a grain or direction on the surface produced by the split.

In light of the foregoing it is apparent that for many uses including substitution for woven, knitted, flocked and/or other nonwoven fabrics in various known uses thereof, a novel class of fabrics that are strong and durable despite a low bulk density, pleasing to the sight and touch and inexpensive to produce is highly desirable. Accordingly, it is an object of this invention to provide such a class of fabrics, a novel process for producing strong though lightweight multi-layered fabrics of that general type and a novel process for producing layered fabrics similarly having strength despite low bulk density and, in addition, a novel surface layer of considerable esthetic appeal. Further objects of the invention will be apparent from the following description and examples in which all percentages are by weight except where otherwise noted.

SUMMARY OF THE INVENTION

In accordance with the present invention, shortcomings of the prior art are overcome and strong, low bulk density products are provided by fabric comprising a layer of bulk fibers predominantly composed of short fibers having essentially no fiber lengths exceeding 10 mm, an essentially parallel layer of reinforcing fibers comprising textile-length fibers and a bonding agent distributed essentially throughout and binding together said layers of fibers, said layer of bulk fibers comprising at least 8 $g/m^2$ of said bulk fibers. In one embodiment the layer of reinforcing fibers comprises continuous strands of textile fibers and the layer of bulk fibers may be a surface layer of said fabric or an interior layer disposed between two layers of reinforcing fibers. In another embodiment the fabric comprises a surface layer of bulk fibers consisting essentially of at least 8 $g/m^2$ of said short fibers and a layer of reinforcing fibers predominantly composed of textile-length fibers and comprising at least 8 $g/m^2$ of said reinforcng fibers. In still another embodiment the fabric comprises two essentially parallel layers of reinforcing fibers predominantly composed of textile-length fibers, a layer of bulk fibers predominantly composed of short fibers having essentially no fiber lengths exceeding 10 mm disposed between said layers of reinforcing fibers and a bonding agent distributed essentially throughout and binding together said layer of bulk fibers and said layers of reinforcing fibers, said short fibers being essentially randomly oriented in the plane parallel to said layers or reinforcing fibers, said layer of bulk fibers comprising at least 16 $g/m^2$ of said bulk fibers and each of said layers of reinforcing fibers comprising at least 8 $g/m^2$ of said reinforcing fibers.

Also provided for use in production of similar fabric is a process which comprises distributing a bonding agent essentially throughout a multi-layered structure comprising two essentially parallel surface layers of reinforcing fibers predominantly composed of textile-length fibers and an interior layer of bulk fibers predominantly composed of short fibers having essentially no fiber lengths exceeding 10 mm, said layer of bulk fibers adjoining each of said layers of reinforcing fibers and comprising at least 16 $g/m^2$ of said bulk fibers, and then setting said bonding agent to bind together said layer of bulk fibers and said layer of reinforcing fibers.

In addition, for production of similar fabric having a surface layer of such bulk fibers, the invention provides a process which comprises disposing between two essentially parallel reinforcing layers of textile-length fibers a layer of bulk fibers essentially randomly oriented in the plane parallel to said reinforcing layers and having essentially no fiber lengths exceeding 10 mm, said layer of bulk fibers comprising at least about 16 g/m² of said bulk fibers, distributing a bonding agent essentially throughout the resulting multi-layered structure, subjecting said structure to heating controlled so as to lower substantially the concentrations of said bonding agent are predetermined locations constituting a two-dimensional continuum bisecting said layer of bulk fibers in a direction generally parallel to said reinforcing layers, setting the bonding agent in the heated structure to bind together said reinforcing layers and said layer of bulk fibers and then splitting said structure by drawing said reinforcing layers in divergent directions with sufficient force to split said layer of bulk fibers along said continuum.

Each of the fabric embodiments of the invention and each of the fabrics produced by the process embodiments of this invention has a variety of uses, in general as substitutes for woven, knitted, other nonwoven and, in some instances, flocked fabrics in virtually any known uses thereof including, for example, durable, semi-durable and disposable apparel, furnishings such as drapery materials, protective and/or decorative coverings of many different articles, such as bookbinding and carpetbacking materials, etc.

DETAILED DESCRIPTION OF THE INVENTION

From the description herein it will be apparent that this invention encompasses fabrics having one, two, three or more of the aforementioned layers of bulk fibers and fabrics having one, two, three or more of the aforementioned layers of reinforcing fibers. In one important embodiment the fabric of this invention has only one such layer of bulk fibers and one such layer of reinforcing fibers, e.g. as in the case of the fabric embodiment of the invention produced by substantially symmetrically splitting a second fabric embodiment of the invention having one such layer of bulk fibers bound between two of such layers of reinforcing fibers. In a third embodiment of the invention the fabric has two of such layers of reinforcing fibers and one of such layers of bulk fibers bound between those two layers of reinforcing fibers in a way not satisfactorily conducive to controlled splitting of the fabric but instead highly resistant to delamination in uses for which such a three-layered, unsplit fibric is attractive. In a fourth embodiment the fabric has one such layer of reinforcing fibers bound between two layers of such bulk fibers, e.g. as provided by constructing a five-layered structure having two such bulk fiber layers alternately disposed between three of such reinforcing fiber layers and then splitting each of those two bulk fiber layers. Hence the fabric of this invention may have zero, one or two surface layers constituted by such bulk fiber layers and zero, one or two surface layers constituted by such reinforcing fiber layers. Many different useful combinations of such layers will be apparent to those skilled in the art from the invention disclosure herein.

The textile-length fibers suitable for use in a reinforcing layer of the fabric of this invention may be composed of a natural or synthetic substance such as cotton, wool, silk, various modified cellulosics, nylon, polyester, acrylic, modacrylic, polyolefin, polyacetal or viscose or cuproammonium rayon, or a blend or other mixture of two or more of such substances. They consist essentially of fibers having lengths greater than 10 mm, including lengths typical of staple (i.e. from about 1 cm up to about 15 cm or longer). The denier of such fibers may be anywhere from about 0.2 to about 70, or even greater. In some attractive embodiments of the invention they are at least partly, and preferably predominantly, present in the form of continuous strands of textile fibers, i.e., continuous filaments or spun yarn. In some of the highest-strength fabrics of this invention the textile-length reinforcing fibers consist essentially of such continuous strands of textile fibers.

The layer of reinforcing fibers in the fabrics of this invention may be knitted, woven, nonwoven (including spunbonded or spunlaced as described in U.S. Pat. Nos. 3,434,188, 3,485,706, 3,485,708 and 3,485,709), needlepunched or, in embodiments utilizing staple, carded. In preferred embodiments, it includes a nonwoven web of organic (typically polymeric) continuous filaments, e.g. a spunbonded nonwoven which may be prepared as described in U.S. Pat. No. 3,536,556 issued Oct. 27, 1970 to P. J. Stevenson et al. Porosity of the layer is desirable to permit the passage of bonding agents dispersed or dissolved in a liquid carrier through that layer. In general, each such layer of reinforcing fibers employed in this invention contains such reinforcing fibers in amounts ranging from about 3 to about 150 or more grams per square meter (g/m²) and preferably from about 6 to about 34 g/m². In order to assist in providing the substantial breaking strength of the fabrics of this invention, the layer of reinforcing fibers also desirably has a breaking strength of at least about 0.1 kg/cm and preferably at least about 0.2 kg/cm.

The bulk fibers which, in general, provide a substantial part and, in most cases, the predominant part of the thickness of the fabrics of this invention without imparting a high bulk density to those fabrics may include organic fibers such as chopped threads or leather or the like, natural fibers including cotton, linen, hemp, silk, wool or wood pulp, synthetic fibers including rayon, acetate, nylon, polyester, acrylics, modacrylics, or a blend or mixture thereof. Predominantly (more than 50%) by weight they are short fibers having essentially no fiber lengths exceeding 10 mm. In some instances, including particularly some instances in which the bulk fiber layer is a surface layer of such fabrics, the bulk fibers may desirably consist essentially of such short fibers, or even of short fibers having essentially no fiber lengths exceeding 5 mm, of which many wood pulp fibers are a preferred example. In fact, it is another desirable feature of various natural (e.g. wood pulp) fibers that they have a curvilinear configuration which provides such a surface layer with a softness to the touch having considerable esthetic appeal for many potential uses of such fabrics. In that regard, defibrated wood pulps are especially preferred in some instances.

Although the fibers in the bulk fiber layer of the fabrics of this invention need not be oriented in any particular manner, it is typically advantageous that they be essentially randomly oriented in the plane generally parallel to an adjacent reinforcing layer of that fabric, i.e., in such instances it is preferred that the bulk fibers be not highly oriented in that plane in the manner typical of fibers that have been carded. In other embodiments including some in which the bulk fiber layer is a surface layer, it is very desirable that the bulk fibers be essentially randomly oriented in all directions so as to provide a surface layer of small fibers having no apparent directionality whatever. Although not necessarily used in all cases, the layer of bulk fibers employed in production of fabrics having a high degree of surface uniformity is preferably essentially uniform in fiber density in the plane parailel to the adjacent layer(s) of reinforcing fibers, i.e., such layers of bulk fibers are preferably non-creped. In other important embodiments in which the fabric of this invention is desirably highly uniform in thickness and/or surface appearance, it is of course desirable that the layer of bulk fibers be one of essentially uniform thickness, as opposed to a fiber layer that has been spot-bonded or otherwise intermittently compacted. Although higher average denier bulk fibers may be used, it is typical in the practice of this invention that the average denier of the bulk fiber be relatively low, e.g. about 0.1 up to about 10 and even more normally between about 0.5 and 5. In most cases, moreover, and although the average denier of the fibers in the reinforcing layer of the fabric may range anywhere from about 0.2 up to about 70 or higher, the average denier of the fibers in the bulk fiber layer is advantageously smaller than the average denier of the fibers in the reinforcing layer. For purposes for such a comparison it may be necessary in some instances, e.g. in the case of some natural fibers having non-circular cross-sections, to convert the cross-sectional area of such fibers to an equivalent denier by multiplying that non-circular cross-sectional area times the apparent density of the fiber and then calculating the weight in grams of 9,000 meters of a fiber having that cross-sectional area and density.

In general, to provide the advantages of the fabrics of this invention including fabric bulk, i.e., the ratio of fabric thickness to the weight per unit area of the fabric, each such layer of bulk fibers used in the fabrics of the invention comprises at least 8 g/m$^2$ of such bulk fibers. For realization of even greater advantages of that type, each such layer of bulk fibers comprises at least 16 g/m$^2$ of such bulk fibers. In other advantageous embodiments including particulary some fabrics having more layers of the reinforcing fibers than layers of such bulk fibers, each such layer of bulk fibers comprises at least about 25 g/m$^2$ of such bulk fibers. There is no known upper limit to the weight of fibers in each such bulk fiber layer but in most instances (i.e., in fabrics weighing between about 15 and about 800 g/m$^2$) the weight of bulk fibers in each such bulk fiber layer does not exceed about 700 g/m$^2$. In fabrics weighing between about 15 and about 400 g/m$^2$, which are typical of those having at least one surface layer of such bulk fibers, the weight of bulk fibers in each such layer of bulk fibers generally does not exceed about 350 g/m$^2$. In general, when the bulk fiber layer contains at least 16 g/m$^2$ of such bulk fibers, the fabric containing one layer of reinforcing fibers weighs at least about 25 g/m$^2$, whereas the fabric containing two layers of reinforcing fibers weighs at least about 35 g/m$^2$. Also in general, when a surface bulk fiber layer contains at least 8 g/m$^2$ of such bulk fibers and a reinforcing fiber layer contains at least 8 g/m$^2$ of reinforcing fibers, the fabric weighs at least about 20 g/m$^2$.

An advantageous feature of bulk fiber layers employed in this invention is low bulk density, i.e. between about 0.03 and about 0.2 g/cc, and especially desirably between about 0.05 and about 0.15 g/cc. Bulk fiber layers having the higher bulk densities within those ranges may be provided by known processes for wet-laying such fibers, typically with the aforementioned random fiber orientation in directions lengthwise and widthwise of the fiber layer, while bulk fiber layers having the lower bulk densities within those ranges may be provided by known processes for dry-laying (e.g. air-laying) of such fibers, typically with random fiber orientation in at least the directions just mentioned and in some cases of particular attraction for use in production of fabrics having a surface layer of such bulk fibers, in all directions within the bulk fiber layer.

Partially as a result of the low bulk densities of such bulk fiber layers, the fabrics of this invention are also characterized by relatively low bulk densities, usually between about 0.2 and about 0.75 g/cc. In the case of fabrics having only one reinforcing fiber layer and/or a surface bulk fiber layer the fabric bulk density is generally between about 0.2 and about 0.5 g/cc, even more typically between about 0.25 and about 0.45 g/cc and, especially with use of a low-density, air-laid bulk fiber layer, usually between about 0.25 and 0.4 g/cc and most often between about 0.25 and about 0.35 g/cc. In the case of fabrics of this invention having at least two reinforcing fiber layers, the fabric bulk density is usually between about 0.25 and 0.75 g/cc, more typically between about 0.3 and about 0.6 g/cc, and most typically between about 0.35 and about 0.5 g/cc although, as will be apparent to those skilled in the art, higher bulk densities can be imparted, if desired, to a fabric of this invention, such as by post-calendering or by incorporating in one or more of the fiber layers at least one additive or filler of higher specific gravity (e.g. clay or $TiO_2$). On the other hand, and partially as a result of the use of the reinforcing fiber layers having substantial breaking strengths as described hereinbefore, the fabrics of this invention are also advantageously characterized by average (of machine direction and transverse direction) breaking strengths of at least about 0.25 kg/cm and typically at least about 0.5 kg/cm. Particularly in the case of the fabric embodiments comprising at least two reinforcing fiber layers, comparable average fabric breaking strengths are usually at least about 0.5 kg/cm and in many instances at least about 1 kg/cm.

The bonding agent employed in this invention may be any of a great variety known in the art as being settable (e.g. thermosettable) by means of curing (i.e., by chemical reaction such as polymerization, cross-linking or the like) or merely drying. It may be of a type that can be distributed through layers of fibers while not diluted by another liquid, but it is more normally first dissolved or dispersed in a liquid medium which may be aqueous or non-aqueous, i.e., organic.

More specifically, the bonding agent employed herein may be a homopolymer, copolymer, terpolymer or mixture thereof. Relevant examples of water-insoluble polymers commonly used in aqueous or organic dispersions include but are not limited to copolymers of butadiene with styrene, acrylonitrile or mixtures thereof; polychloroprene; homo- and copolymers of isoprene; homo- and copolymers of vinyl chloride and vinylidene chloride; homo- and copolymers of acrylic esters, i.e., esters of acrylic acid and alpha-substituted arcylic acids such as methyl, ethyl, propyl, isopropyl, isobutyl, amyl, octyl or 2-ethyl hexyl acrylate or methyl methacrylate, ethyl methacrylate, butyl methacrylate, lauryl methacrylate, methyl ethacrylate, benzyl arcylate, dimethyl itaconate and mixtures thereof; copolymers of acrylonitrile with any of those acrylic esters, styrene, vinyl chloride or a mixture thereof; polysulfides, polyamides; polyesters; polyesteramides; polyvinyl butyral; polyvinyl acetate; polyvinyl propionate; and mixtures thereof.

The amount of such a water-insoluble polymer advantageously employed in this invention depends generally upon the particular polymer employed, its particle size and the desired consistency of the bonding agent. The weight of polymer solids in a dispersion ready for use in a process of this invention may be, for example, between 1% and 75%, but is usually between 2% and 50% and more usually between 5% and 40%.

Relevant examples of water-soluble polymers useful as bonding agents include but are not limited to partially hydrolyzed polyvinyl acetate; polyvinyl alcohol; polyvinyl pyrrolidone; polyacrylic and polymethacrylic acids and salts thereof; polyacrylamide; polymethacrylamide; starch; dextrins; and sodium celllulose xanthate. The concentrations of such water-soluble polymers in solutions thereof employed in the process of this invention are normally between about 2% and about 50%.

Preferred bonding agent formulations include water-insoluble polymers dispersed in water, e.g. an acrylic polymer dispersed in water. As with others of the aforementioned bonding agents, the concentration of such a polymer in the dispersion employed can have an important effect on properties of the fabric produced. Generally, higher concentrations provide a more tightly bonded fabric. Together with relatively high rates of heat-setting, in fact, the use of solids concentrations on the order of 25–30% of such a polymer can provide a fabric of this invention, e.g. one having a layer of bulk fibers disposed between two layers of reinforcing fibers, having a delamination resistance of at least about 120 g/cm of fabric width or even up to more than 200 g/cm of fabric width such that in some cases the fabric will rupture before it delaminates. It will be apparent that such high levels of delamination resistance are very attractive for fabric durability in uses involving repeated substantial stress on the fabric. Of course for purposes of a desirably high fabric delamination resistance it is preferred that the bonding agent employed be not excessively selective for the particular bulk fibers or reinforcing fibers of which that fabric is comprised.

The manner in which the fiber layers are put together and the techniques which may be used to distribute the bonding agent throughout the resulting multi-layered structure are known in the art. For example, a convenient method is to supply two reinforcing fiber layers, one to each side of a bulk fiber layer as the latter passes across a spreader roll, and then maintain the three fiber layers in close contact while the bonding agent is applied thereto, e.g. by dipping in the solution or dispersion of the bonding agent or by spraying or flowing the solution or dispersion thereon. It is, however, important to the present invention that the bonding agent be thereby distributed essentially throughout and preferably essentially uniformly throughout the multi-layered structure, as opposed to an incomplete and/or patterned penetration, so that the fabrics of this invention have their characteristic properties of substantial strength despite low bulk density, high delamination resistance, product uniformity, etc. One of the best ways to assure that the bonding agent is distributed essentially throughout or essentially uniformly throughout the structure is of course to first saturate the structure with the bonding agent, after which any excess desirably not present in the structure during setting of the bonding agent may be removed (e.g. by squeezing of the structure between rollers), and this is a technique preferred for use in many embodiments of the invention, although it is not always required that saturation with the bonding agent be carried out to achieve satisfactory fabric properties.

As mentioned hereinbefore, the invention also includes a process for producing fabrics having a surface layer of the aforedescribed bulk fibers by forming a multi-layered structure having such a bulk fiber layer bound between two layers of textile-length reinforcing fibers and then splitting that structure along a two-dimensional continuum bisecting the bulk fiber layer in a direction generally parallel to the reinforcing fiber layers in that structure. Previous attempts at such splitting of a fiber layer, e.g. as described in U.S. Pat. No. 3,437,539, have been carried out by either (a) preventing bonding agent from completely penetrating the fiber layer to be split and then splitting the fiber layer in the intermediate unbonded zone or (b) interposing a relatively thin layer of larger denier fibers in the plane along which splitting is to take place so that, after through-bonding of the resulting three-layered web, the web will split in the zone of the larger denier fibers. Because of incomplete fiber bonding in the plane of splitting, the former of those approaches results in products having a split surface that is non-uniform and high linting. The latter approach, on the other hand, results in split surfaces having a fiber denier larger than may be desired for production of a soft, pleasing surface and also incurs the added costs of using a second short fiber feed stock and the additional process step of interposing the layer of larger denier fibers.

Those problems are overcome by the process of the present invention in which, as aforesaid, the multi-layered structure having unset bonding agent distributed essentially throughout its layers is subjected to heating controlled so as to lower substantially the concentrations of the bonding agent at predetermined locations constituting, as aforesaid, a two-dimensional continuum bisecting a bulk fiber layer of that structure and, after setting of bonding agent in the heated structure, the structure is split along that continuum by an orderly drawing (i.e., pulling) of the adjacent reinforcing fiber layers of that structure, together with the portions of the split bulk fiber layer that adhere to each of those reinforcing layers, in divergent directions and with force sufficient to split the bulk fiber layer along that continuum. An important discovery underlying this process is that heating of the structure containing unset bonding agent can be controlled in intensity, duration, pattern, etc. so as to predetermine the locations of lowest bonding agent concentration within a bulk fiber layer of that structure and that subsequent splitting of the structure after setting of the bonding agent follows, in a highly reproducible manner, the continuum connecting those predetermined locations.

In general, the rate of setting (i.e., curing and/or drying) of the bonding agent is importantly controlled by such heating to predetermine the locations within the bulk fiber layer at which the bonding agent concentrations are lowest following such setting of the bonding agent. As is known in the art, the setting rates of typical bonding agents are also affected by other factors such as, for example, the natures of the particular bonding agent and the liquid (if any) in which it has been dispersed or dissolved to facilitate its distribution through the structure in which it is to be set, the concentrations of the bonding agent in that liquid and that structure, and the presence of additives such as, for instance, surface active agents with influence the surface tension of that liquid. It has been found that the flow rates of air or other drying gases across the surfaces of the structure being subjected to such heating are also a factor that generally affects the setting rates of such bonding agents. It is within the scope of this invention to observe the effects of such heating, together with the effects of such other factors, on the lowering of concentrations of bonding agent within the structure being heated and then, on the basis of those observations, predetermine the locations at which and the degrees to which such lowering will normally take place as a result of such heating in the presence of such other factors. In general, however, and with such other factors being equal, heating one side of the multi-layered structure with greater intensity than the other side results in the locations of lowest concentrations of bonding agent in a bulk fiber layer inside that structure being closer to the side heated with less intensity and, consequently, subsequent splitting of that bulk fiber layer occurring closer to the side heated with less intensity.

Thus in one embodiment of the invention, heating the two sides of a symmetrical multi-layered structure symmetrically, i.e., at the same time and with the same intensity, normally results in the predetermined locations of lowest bonding agent concentrations lying generally in a plane situated essentially midway between the two surfaces of that structure and subsequent splitting of the structure taking place in that plane, producing two essentially identical split fabric products. In another embodiment of the invention, heating of a similar structure is controlled with uniformly greater intensity on one side of the structure than on the other side, resulting in a plane of lowest bonding agent concentrations parallel to but nearer the side heated with less intensity and, consequently, splitting of the bulk fiber layer occurring nearer that side providing two split fabric products having different fabric weights and thicknesses but each with a uniform planar split surface. In still another embodiment, the relative intensities of the heating of the two sides of a similar structure are varied in a planned pattern such that the locations of lowest bonding agent concentrations within the bulk fiber layer of that structure lie in a two-dimensional but non-planar continuum bisecting that bulk fiber layer in a direction generally parallel to the adjacent reinforcing fiber layers but varying in proximity to each of those reinforcing fiber layers providing two split fabric products having patterns of split bulk fiber layer thickness that are mirror images of each other. Most conveniently such patterns are in the nature of striped effects, but a great variety of other patterns can be devised.

Heating of the multi-layered structure for the purposes just described is usually preferably carried out until the structure is essentially dry, and may be carried out with varied means including, for example, radiant heaters, can dryers or other surfaces maintained at elevated temperatures, convection or forced air ovens, etc. Subsequent splitting of the structure containing dried bonding agent is likewise carried out by any convenient technique such as, for example, initiating the split at the exit nip of a pair of rolls through which the structure has been passed and then drawing the split layers over take-up rolls separated such that the split layers are drawn in divergent directions which may be at any substantial angle to one another, e.g. from less than 30° up to virtually 180°.

As normally carried out, the process just described leaves at least some bonding agent at all locations throughout the split product fabric, providing thereby an unexpected result not achieved by the prior art, i.e. a fabric that has not only the characteristics of substantial breaking strength despite low bulk density, but also an esthetically pleasing surface that is low-linting. The pre-split precursor of this fabric is normally characterized by a high average delamination resistance, e.g. at least about 60 g/cm of fabric width, and by a high degree of uniformity of such resistance such that product uniformity of the split fabrics is also very high. For example, it is typical for the multi-layered fabric subjected to heating controlled as described hereinbefore to have an average delamination resistance of at least about 60 g/cm of fabric width with no more than 10% of the fabric having a delamination resistance varying more than 20% or, in many cases, even 10% from that average.

Particularly when the split fabric product is made using a bulk fiber layer consisting essentially of wood pulp fibers of random orientation, the surface generated by the splitting is normally composed of substantially curvilinear fiber portions generally completely randomly oriented. By the term curvilinear is meant a generally curving configuration having no specific regularity of degree or continuity of curve. Microscopic scrutiny of a cross-section of the split layer discloses extremely few, if any, straight fibers and a great predominance of curly fibers having curls ranging from very tight to partly straight and partly curved. There is noted no preponderant directionality of curve or any apparent relation of curl to the direction from which the splitting forces were applied during splitting of the multi-layered structure. This random curvilinearity of the surface fibers is significant in that it provides a fabric surface that is surprisingly soft and pleasing to the touch. Another feature differentiating this product from prior art layered fabrics is its air permeability which is normally at least 5, in most cases at least 10, and in many cases at least 20 $cc/cm^2$ sec at a differential pressure of 12.7 mm of water.

The following examples are illustrative only and do not imply any limitations on the scope of the invention. As expressed herein, fabric properties are determined by the following methods wherein ASTM is American Society for Testing Materials:

Breaking Strength—ASTM D 1682-64
Delamination Resistance—ASTM D 2724
Thickness—ASTM D 1777-64 employing a pressre of 5.6 $g/cm^2$
Elmendorf Tear Strength—ASTM D 1424
Trapezoid Strength—ASTM D 2263
Air Permeability—ASTM D 737-69
Launderability—American Association of Textile Chemists and Colorists (AATCC) 124-1967
Linting—ASTM D 1163-53 wherein the test apparatus is modified by replacing the bronze screen with a black double-knit polyester fabric adhered to a rigid structure. The test specimen is mounted and rubbed against the knit fabric for 50 cycles. The lint from the specimen retained on the knit fabric surface is removed by pressing against that surface a strip of high-clarity matt-surface translucent adhesive tape, such as Scotch brand Magic Tape by 3M Company, and then removing the tape from that surface. The tape with lint on its adhesive surface is placed between a black background and the microscope of an image analysis computer, such as a Model B Quantimet by Metals Research Co., Results are reported as percent of white area based on the black area within the field of the analyzer microscope.

EXAMPLE I

Using apparatus of the type described in U.S. Pat. No. 3,581,706 there is prepared an air-laid bulk fiber layer containing 34 g/m$^2$ of randomly oriented Swedish softwood pulp fibers having a predominant fiber length of 2.75 mm, essentially no fiber lengths exceeding 5 mm and an average fiber denier of 1.13. To help maintain its integrity during handling, this layer is sprayed with enough of a 15%-solids aqueous dispersion of a styrene-butadiene rubber latex bonding agent to deposit 3 g/m$^2$ of the bonding agent on each side of the layer and dried in a 175° C. hot air oven. A half-meter width of the resulting layer, which has a bulk density of 0.06 g/cc and is essentially uniform in thickness and homogeneous in fiber density and average fiber denier, is laid between two reinforcing fiber layers each consisting of an 11 g/m$^2$ spunbonded nonwoven continuous filament (3.9 denier per filament) nylon 66 fabric prepared as described in U.S. Pat. No. 3,536,556 and having an average breaking strength of 0.71 kg/cm (1.06 kg/cm in the machine direction and 0.36 kg/cm in the transverse direction). The resulting three-layered structure is immersed for 10 seconds in an aqueous bath containing 26% of a self-reactive acrylic copolymer bonding agent (backbone composition-butyl acrylate/ethyl acrylate; polymer $T_g$ of −30° C.), 13% finely divided TiO$_2$ and 1% oxalic acid, whereby this bonding agent is distributed essentially throughout the structure and essentially uniformly (i.e., in saturation concentration) throughout the bulk fiber layer within that structure. The wet structure is passed through the nip of a pair of driven steel squeeze rolls set to maintain a gap of 0.038 mm and then to a pin tenter which holds the structure in tension throughout drying and curing of the bonding agent which is carried out by passing the structure through a four-meter long, gas-fired, hot air oven maintained at 170° C. The fabric thereby produced has an average breaking strength of 2.9 kg/cm (3.9 kg/cm in the machine direction and 1.9 kg/cm in the transverse direction) despite its low bulk density of 0.44 g/cc. The weight of the fabric is 124 g/m$^2$ and it has an average delamination resistance of 220 g/cm of fabric width. It is soft and flexible and, when dyed an appropriate color, it looks remarkably like leather. Other properties of the fabric together with, for comparison purposes, the corresponding properties of the spunbonded nylon reinforcing fabric used in production of the fabric are as follows:

| Property | Reinforcing Fabric | Product Fabric |
|---|---|---|
| Thickness, mm | 0.05 | 0.28 |
| Elmendorf tear strength, grams | 531 | 513 |
| Air permeability, cc/cm$^2$ sec | 457 | 35 |
| Launderability cycles before pilling observed | 2 | 20 |
| Trapezoid tear strength, kg | | |
| Machine direction | 1.9 | 2.1 |
| Transverse direction | 1.3 | 1.4 |

EXAMPLE II

When there is carried out a procedure essentially like that of Example I except that the bulk fiber layer contains 68 g/m$^2$ of the same kind of wood pulp fibers and the squeeze rolls gap is 0.64 mm, the product fabric has the following properties: Average Breaking Strength—5,5 kg/cm (M.D. 7.3 kg/cm; T.D. 3.7 kg/cm); Bulk Density—0.35 g/cc; Weight—165 g/m$^2$; Thickness—0.47 mm; Trapezoid Tear Strength—3.26 kg in the machine direction and 2.95 kg in the transverse direction. It looks and feels essentially like the product fabric of Example I except for the difference in thickness and weight.

EXAMPLE III

When there is carried out a procedure essentially like that of Example I except that the bulk fiber layer containing 34 g/m$^2$ of the same kind of wood pulp fibers is prepared by a wet-laid method of the type described in U.S. Pat. No. 3,622,449 and consequently has a higher bulk density of 0.145 g/cc, the product fabric has the following properties: Average Breaking Strenth—2.7 kg/cm (M.D. 3.6 kg/cm: T.D. 1.8 kg/cm); Bulk Density—0.47 g/cc; Weight—132 g/m$^2$; Thickness—0.28 mm.

EXAMPLE IV

Using apparatus of the type described in U.S. Pat. No. 3,581,706 there is prepared an air-laid bulk fiber layer containing 74.4 g/m$^2$ of randomly oriented Swedish softwood pulp fibers having a predominant fiber length of 2.75 mm, essentially no fiber lengths exceeding 5 mm and an average fiber denier of 1.13. To help maintain its integrity during handling, this layer is sprayed with enough of a 10%-solids aqueous dispersion of an acrylonitrile rubber latex bonding agent (polymer $T_g$ of −30° C.) to deposit 2.8 g/m$^2$ of the bonding agent on each side of the layer and dried by contact with a series of four smooth steel rolls, the first two having surface temperatures of 250° C. and the latter two 150° C. A half-meter width of the resulting layer which has a bulk density of 0.06 g/cc and is essentially uniform in thickness and homogeneous in fiber density and average fiber denier, is laid between two reinforcing fiber layers each consisting of an 11 g/m$^2$ spunbonded nonwoven continuous filament (3.9 denier per filament) nylon 66 fabric prepared as described in U.S. Pat. No. 3,536,556 and having an average breaking strength of 0.71 kg/cm (1.06 kg/cm in the machine direction and 0.36 kg/cm in the transverse direction). The resulting three-layered structure is immersed for 10 seconds in an aqueous bath containing 20% of a self-reactive acrylic copolymer bonding agent (backbone composition-butyl acrylate/ethyl acrylate; polymer $T_g$ of −30° C.), such that this bonding agent is distributed essentially throughout the structure and essentially uniformly (i.e., in saturation concentration) throughout the bulk fiber layer within that structure. The wet structure is passed between a pair of driven squeeze rolls exerting a nip force of 0.57 kg/cm and then to a clip tenter in which it is held in tension during subsequent drying and curing of the bonding agent. The structure is next passed at a linear rate of 0.8 m/min. between 16 matched pairs of 250-watt infra-red light bulbs arranged in eight rows (four above and four below) transverse to the direction of the structure movement with four 250-watt buls per row, each row of bulbs and the bulbs in each row having their centers spaced apart 16 cm and each bulb being spaced 20 cm from the structure passing between the bulbs. Then the structure is passed at the same linear rate between three matched pairs of 1100-watt infra-red strip heaters each 60 cm long and disposed perpendicular to the direction of structure movement, said heaters being spaced 30 cm apart in the direction of structure movement and located 13 cm above and below the structure passing between the heaters. Thereafter passing the dried structure between two rolls, initiating separation of the reinforcing layers of that structure at the exit side of the nip and then drawing the separated layers in divergent directions from the exit nip at a uniform linear rate of 30 m/min. results in splitting of the dried structure along a plane essentially mid-way between (i.e., equi-distant from) the two reinforcing fabric layers, producing two nearly identical product fabrics each having a bulk density of 0.32 g/cc and a surface wood pulp fiber layer which is soft and pleasing to the touch, remarkably uniform in thickness, low linting (below 2%) and homogeneous in fiber density and average fiber cross-sectional area. The weight of each product fabric is 73 g/m$^2$. Other properties of the product fabrics together with, for comparison purposes, the corresponding properties of the spunbonded nylon reinforcing material used in production of the fabrics are as follows:

|  | Reinforcing Material | Product Fabrics | |
|---|---|---|---|
|  |  | Portion A | Portion B |
| Breaking Strength, kg/cm |  |  |  |
| Average | 0.71 | 1.34 | 1.43 |
| Machine Direction | 1.06 | 1.78 | 1.91 |
| Transverse Direction | 0.36 | 0.90 | 0.95 |
| Thickness, mm | 0.05 | 0.23 | 0.23 |
| Elmendorf tear strength, grams | 531 | 415 | 385 |
| Air permeability, cc/cm$^2$ sec | 457 | 48 | 47 |
| Launderability |  |  |  |
| Weight loss, % | 2 | 2 | 2 |
| Visual Observation | Pills | OK | OK |

Duplicate analyses of (1) a sample consisting of the top (surface) 5% of the wood pulp layer of each of the two fabrics (portions A and B) produced by similarly splitting a swatch of the aforementioned dried structure and (2 & 3) two samples each consisting of the other 95% of that layer in one of said portions A and B reveal that the samples contain the following percentages of bonding agent:

|  | Sample 1 | Samples 2 & 3 | |
|---|---|---|---|
|  |  | Portion A | Portion B |
| First Swatch | 18.8 | 42.3 | 37.9 |
| Second Swatch | 17.7 | 40.1 | 39.4 |

The dried structure split as described hereinbefore has an average delamination resistance of 91 g/cm of sample width, measured using a sample strip cut 2.54 cm wide running in the machine direction and an Instron machine set for a full scale load of 500 grams and a crosshead speed of 0.3 m/min. None of the measured values of delamination resistance vary more than 15% from that average, and fewer than 5% vary more than 10% from that average.

COMPARATIVE EXAMPLE A

When there is carried out a procedure essentially like that of Example IV except that the squeezed wet structure is not heated to control the lowering of concentrations of the bonding agent at predetermined locations within the wood pulp fiber layer but rather is allowed to dry at room temperature, several hours are required to complete the drying, the dried multi-layered structure does not split uniformly and, consequently, the two product fabrics are non-uniform in thickness and their wood pulp fiber surfaces have a patchy appearance indicative of non-uniform splitting.

EXAMPLES V & VI

When there is carried out two times a procedure essentially like that of Example IV except that the weights of the bulk fiber layer and the bonding agent applied directly to each side of that layer to help maintain its integrity during handling are varied as shown below, there is produced in each case two nearly identical product fabrics each having a surface wood pulp fiber layer and launderability and linting characteristics essentially the same as those of the product fabrics in Example IV. Other properties of the present product fabrics, expressed as the average of those of the two product fabrics produced in each case, are as follows:

|  | Example V | Example VI |
|---|---|---|
| Bulk fiber layer |  |  |
| Wood pulp fiber, g/m$^2$ | 34 | 102 |
| Initial bonding agent, g/m$^2$ | 3 | 9 |
| Product fabrics |  |  |
| Weight, g/m$^2$ | 49 | 104 |
| Bulk density, g/cc | 0.26 | 0.28 |
| Breaking strength, kg/cm |  |  |
| Average | 1.15 | 1.42 |
| Machine direction | 1.69 | 1.89 |
| Transverse direction | 0.61 | 0.95 |
| Thickness, mm | 0.19 | 0.37 |
| Elmendorf tear strength, grams |  |  |
| Machine direction | 322 | 656 |
| Transverse direction | 314 | 475 |
| Air permeability, cc/cm$^2$ sec | 95 | 40 |

EXAMPLE VII

When there is carried out a procedure essentially like that of Example IV except that the wood pulp fibers in the bulk fiber layer are high alpha-cellulose softwood fibers having an average fiber denier of about 1.1 and essentially no fiber lengths exceeding 5 mm and the bulk fiber layer is prepared by a wet-laid method of the type described in U.S. Pat. No. 3,622,449 and consequently has a higher bulk density of 0.145 g/cc, there are produced two nearly identical 76 g/m$^2$ product fabrics each having a bulk density of 0.42 g/cc and a surface wood pulp fiber layer and launderability and linting characteristics essentially the same as those of the Example IV product fabrics. Other properties of the product fabrics of this example are as follows:

|  | Portion A | Portion B |
|---|---|---|
| Breaking strength, kg/cm |  |  |
| Average | 1.34 | 1.34 |
| Machine direction | 1.79 | 1.80 |
| Transverse direction | 0.89 | 0.88 |
| Thickness, mm | 0.18 | 0.18 |
| Elmendorf tear strength, grams | 583 | 578 |
| Air permeability, cc/mm$^2$ sec | 11 | 12 |

Duplicate analyses of samples of the wood pulp fiber layers of the product fabrics, carried out as in Example IV, give the following results:

|  | Sample 1 | Samples 2 & 3 Portion A | Samples 2 & 3 Portion B |
|---|---|---|---|
| First Swatch | 26.9 | 38.2 | 38.3 |
| Second Swatch | 27.6 | 41.7 | 38.7 |

Results of measurements of the delamination resistance of the dried structure split in accordance with the procedure of this example are essentially the same as those in Example IV.

EXAMPLES VIII–X

When there are carried out procedures essentially like that of Example IV except that the reinforcing materials described below are used in place of the nonwoven nylon 66 reinforcing fabric, the average properties of the two nearly identical product fabrics are as follows:

|  | Example VIII | Example IX | Example X |
|---|---|---|---|
| Reinforcing material | Rayon carded web (Fabray by Stearns & Foster) | Spunbonded nonwoven polyester fabric (Reemay by DuPont) | Woven cotton cloth 66 × 48, 75 g/m² |
| Weight, g/m² | 23.7 | 20 | 75.3 |
| Bulk density, g/cc | 0.16 | 0.15 | 0.28 |
| Breaking strength, kg/cm |  |  |  |
| Machine direction | 1.4 | 0.6 | 3.6 |
| Transverse direction | 0.2 | 0.4 | 2.3 |
| Average | 0.8 | 0.51 | 2.9 |
| Elmendorf tear strength, grams | 98 | 542 | 634 |
| Air permeability, cc/cm² sec | 341 | 536 | 218 |
| Product Fabrics |  |  |  |
| Bulk density, g/cc | 0.27 | 0.26 | 0.35 |
| Weight, g/m² | 90.5 | 85.1 | 168 |
| Thickness, mm | 0.33 | 0.32 | 0.47 |
| Breaking strength, kg/cm |  |  |  |
| Machine direction | 1.9 | 1.4 | 7.5 |
| Transverse direction | 0.75 | 0.8 | 3.8 |
| Average | 1.33 | 1.1 | 5.7 |
| Elmendorf tear strength, grams | 140 | 565 | 761 |
| Air permeability, cc/cm² sec | 41 | 35 | 41 |
| Launderability |  |  |  |
| Weight loss, % | 2 | 7 | 3 |
| Visual observation | OK | Scrim pills | Loose web |

Linting of each of the product fabrics is tested and found very low.

EXAMPLE XI

When there is carried out a procedure essentially like that of Example IV except that the following are used in place of the bonding agents employed therein, the average properties of the two nearly identical product fabrics are as shown below:

| Bulk fiber layer bonding agent | Styrene-butadiene rubber latex |
|---|---|
| Carrier | Water |
| Solids in dispersion, % | 10 |
| Amount on each side, g/m² | 2.8 |
| Bonding agent for three-layered structure | Styrene-butadiene rubber latex |
| Carrier | Water |
| Solids in dispersion, % | 20 |
| Amount in structure, % | 36 |
| Fabric properties |  |
| Weight, g/m² | 81 |
| Bulk density, g/cc | 0.35 |
| Thickness, mm | 0.23 |
| Average breaking strength, kg/cm | 1.1 |
| Elmendorf tear strength, grams | 594 |
| Air permeability, cc/cm² sec | 26 |
| Launderability |  |
| Weight loss, % | 6 |
| Visual observation | OK |

EXAMPLE XII

When there is carried out a procedure essentially like that of Example IV except that instead of the acrylic copolymer bonding agent there is used a 10.4%-solids dispersion of a caprolactone polyester cross-linked with an aminoplast dissolved in a solvent additionally composed of 44.8% xylene, 30% 2-ethoxyethanol and 14.8% isopropanol, the product fabrics have similarly satisfactory properties.

EXAMPLES XIII & XIV

When there are carried out procedures essentially like that of Example VII except that in one case about 30% of the bulk fibers are high alpha-cellulose hardwood pulp fibers and about 10% are 1.5-denier rayon fibers 6.3 mm in length providing a bulk fiber layer density of 0.15 and in another case there are incorporated in the bulk fiber layer 25% clay, 5% $TiO_2$ and 5% of similar rayon fibers, based on the weight of the softwood pulp fibers in that layer, the product fabrics have similarly satisfactorily properties including in the former case an average breaking strength of 3.3 kg/cm and an Elmendorf tear strength of 626 grams.

EXAMPLES XV & XVI

When there are carried out procedures essentially like that of Example IV except that in one case there is incorporated in the bulk fiber layer 2.7% china clay and 0.3% talc and in another case there is included in the acrylic copolymer bonding agent dispersion 16.8%, based on the weight of the bonding agent, of an aqueous dispersion containing 65% rutile $TiO_2$ and 4.4% each of a methacrylate resin and 2-butoxyethanol, the product fabrics have similarly satisfactory properties.

I claim:
1. A process which comprises disposing between two essentially parallel reinforcing layers of textile-length fibers a layer of bulk fibers essentially randomly oriented in the plane parallel to said reinforcing layers, said layer of bulk fibers having essentially no fiber lengths exceeding 10 mm, and said layer of bulk fibers comprising at least about 16 g/m² of said bulk fibers, distributing a settable bonding agent essentially throughout the resulting multi-layered structure, subjecting said structure to heating applied to the surfaces thereof and controlled so as to lower substantially the concentrations of said bonding agent in relation to the fibers in a two-dimensional continuum disposed in said layer of bulk fibers in a direction generally parallel to said reinforcing layers, setting the bonding agent in the heated structure to bind together said reinforcing layers and said layer of bulk fibers and then splitting said structure by drawing said reinforcing layers in divergent directions with sufficient force to split said layer of bulk fibers along said continuum.

2. The process of claim 1, said reinforcing layers each having a breaking strength of at least about 0.1 kg/cm and a weight not exceeding about 150 g/m² and said layer of bulk fibers having a bulk density between about 0.03 and 0.2 g/cc and a weight not exceeding about 700 g/m².

3. The process of claim 2 wherein said distributing is carried out such that the resulting concentrations of said bonding agent in the layer of bulk fibers in said structure are essentially uniform throughout said layer of bulk fibers and said heating is controlled such that said continuum is essentially a plane parallel to said reinforcing layers.

4. The process of claim 3, said plane being essentially mid-way between said reinforcing layers.

5. The process of claim 4, said bulk fibers consisting essentially of wood pulp fibers and at least one of said reinforcing layers being predominantly composed of continuous strands of organic textile fibers.

* * * * *